(12) United States Patent
Ishikawa

(10) Patent No.: US 10,491,776 B2
(45) Date of Patent: Nov. 26, 2019

(54) EXPOSURE DEVICE AND LIGHT RECEIVING DEVICE

(71) Applicant: Oki Data Corporation, Minato-ku, Tokyo (JP)

(72) Inventor: Takuma Ishikawa, Gunma (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 15/652,922

(22) Filed: Jul. 18, 2017

(65) Prior Publication Data

US 2018/0034999 A1 Feb. 1, 2018

(30) Foreign Application Priority Data

Jul. 29, 2016 (JP) ................................ 2016-149163

(51) Int. Cl.
| | | |
|---|---|---|
| H04N 1/00 | (2006.01) | |
| H04N 1/03 | (2006.01) | |
| G03G 15/04 | (2006.01) | |
| H04N 1/024 | (2006.01) | |
| H04N 1/028 | (2006.01) | |

(52) U.S. Cl.
CPC ... H04N 1/02481 (2013.01); G03G 15/04036 (2013.01); G03G 15/04054 (2013.01); H04N 1/00525 (2013.01); H04N 1/0249 (2013.01); H04N 1/02865 (2013.01); H04N 1/0306 (2013.01); H04N 2201/0094 (2013.01)

(58) Field of Classification Search
CPC ............. H04N 1/02481; H04N 1/0306; H04N 1/0249; H04N 1/00525; H04N 1/02865; H04N 2201/0094; G03G 15/04054; G03G 15/04036

USPC ......................................................... 358/1.14
See application file for complete search history.

(56) References Cited

U.S. PATENT DOCUMENTS

| | | | | |
|---|---|---|---|---|
| 5,850,247 A | * | 12/1998 | Hamada | ................... B41J 2/451 347/241 |
| 2010/0020301 A1 | * | 1/2010 | Sugiyama | ................... B41J 2/45 355/67 |
| 2017/0025572 A1 | * | 1/2017 | Shichijo | ................... H01L 33/20 |

FOREIGN PATENT DOCUMENTS

| | | |
|---|---|---|
| JP | S63199380 A | 8/1988 |
| JP | 2002067373 A | 3/2002 |
| JP | 2002094122 A | 3/2002 |
| JP | 2007081081 A | 3/2007 |
| JP | 2009302745 A | 12/2009 |
| JP | 2012249253 A | 12/2012 |

* cited by examiner

*Primary Examiner* — Tammy Paige Goddard
*Assistant Examiner* — Darryl V Dottin
(74) *Attorney, Agent, or Firm* — Panitch Schwarze Belisario & Nadel LLP

(57) ABSTRACT

An exposure device includes a plate member, a plurality of light-emitting elements, and an optical system. The plate member extends in both a first direction and a second direction intersecting with the first direction. The light-emitting elements are disposed on the plate member side by side in the first direction. The light-emitting elements emit respective light beams in the second direction. The optical system is disposed on the plate member and faces the light-emitting elements in the second direction. The optical system performs imaging of the light beams emitted by the respective light-emitting elements.

10 Claims, 11 Drawing Sheets

EXPOSURE DEVICE AND LIGHT RECEIVING DEVICE

CROSS REFERENCE TO RELATED APPLICATIONS

The present application claims priority from Japanese Patent Application No. 2016-149163 filed on Jul. 29, 2016, the entire contents of which are hereby incorporated by reference.

BACKGROUND

The technology relates to an exposure device including a plurality of light-emitting elements and to a light receiving device including a plurality of light-receiving elements.

An exposure head including a plurality of light-emitting elements such as light-emitting diode (LED) elements is used in various image forming apparatuses. Non-limiting examples of such image forming apparatuses may include an electronic printer and a facsimile apparatus that each form an image by electrophotography scheme. For example, reference is made to Japanese Unexamined Patent Application Publication No. 2007-81081.

SUMMARY

An exposure device such as the exposure device described above is required to be smaller in size.

It is desirable to provide an exposure device having a structure suitable for reduction in size, and an image forming apparatus provided with the exposure device. It is also desirable to provide a light receiving device having a structure suitable for reduction in size and an image reader provided with the light receiving device.

According to one embodiment of the technology, there is provided an exposure device including a plate member, a plurality of light-emitting elements, and an optical system. The plate member extends in both a first direction and a second direction intersecting with the first direction. The light-emitting elements are disposed on the plate member side by side in the first direction. The light-emitting elements emit respective light beams in the second direction. The optical system is disposed on the plate member and faces the light-emitting elements in the second direction. The optical system performs imaging of the light beams emitted by the respective light-emitting elements.

According to one embodiment of the technology, there is provided an image forming apparatus including the foregoing exposure device.

According to one embodiment of the technology, there is provided a light receiving device including a plate member, a plurality of light-receiving elements, and an optical system. The plate member extends in both a first direction and a second direction intersecting with the first direction. The light-receiving elements are disposed on the plate member side by side in the first direction. The optical system is disposed on the plate member and faces the light-receiving elements in the second direction. The optical system performs imaging, with respect to the light-receiving elements, of a light beam entering from outside.

According to one embodiment of the technology, there is provided an image reader including the foregoing light receiving device.

DETAILED DESCRIPTION

Some example embodiments of the technology are described below in detail with reference to the accompanying drawings. It is to be noted that the description below describes mere specific examples of the technology, and the technology is therefore not limited thereto. Further, the technology is not limited to factors such as arrangements, dimensions, and dimension ratios of components illustrated in the respective drawings. The description is given in the following order.

1. First Example Embodiment (An exposure device and an image forming apparatus in each which a pedestal is disposed on a plate member and light-emitting elements are disposed on the pedestal)
2. Second Example Embodiment (An image reader provided with a light receiving device)
3. Other Modification Examples

1. First Example Embodiment

[Outline Configuration of Exposure Device 10]

Figure 1A:
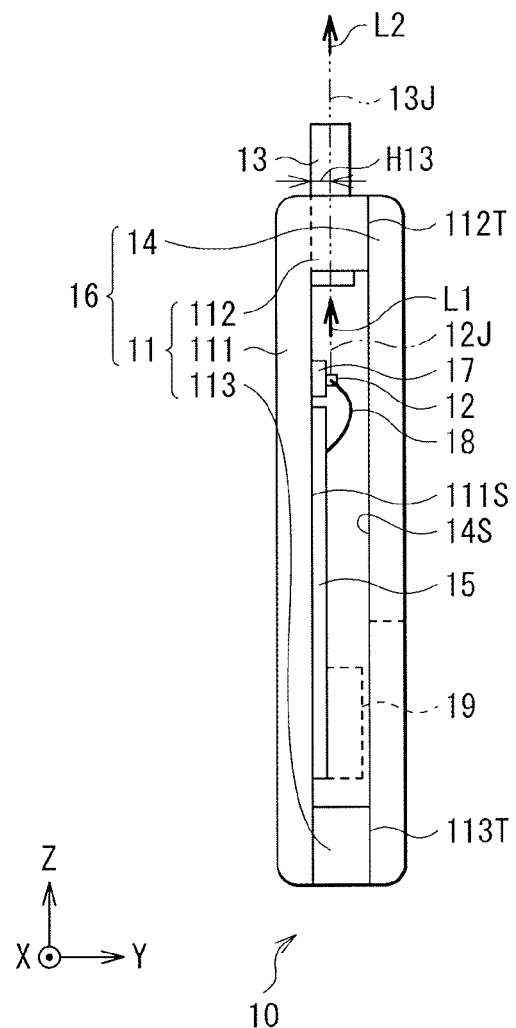
FIG. 1A is a front view of an example of an overall configuration of an exposure device according to a first example embodiment of the technology.
Figure 1B:
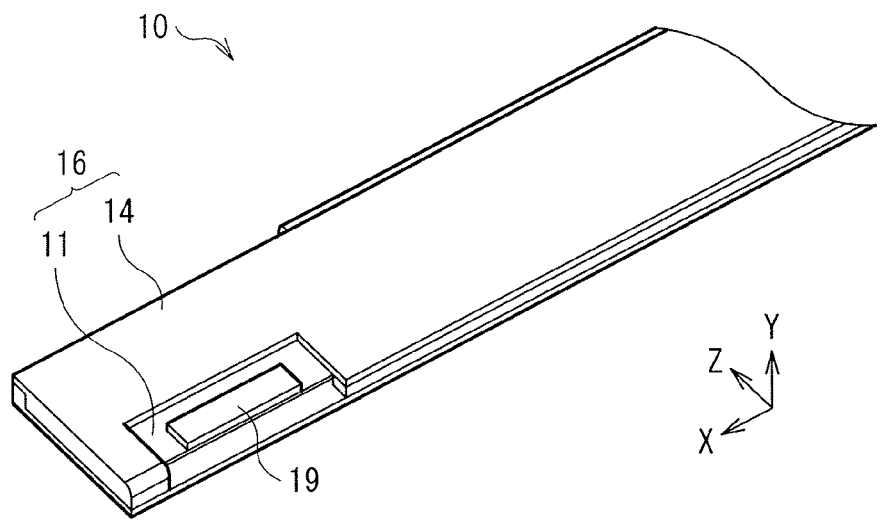
FIG. 1B is a perspective view of an example of an appearance of an exposure device illustrated in FIG. 1A.
Figure 1C:
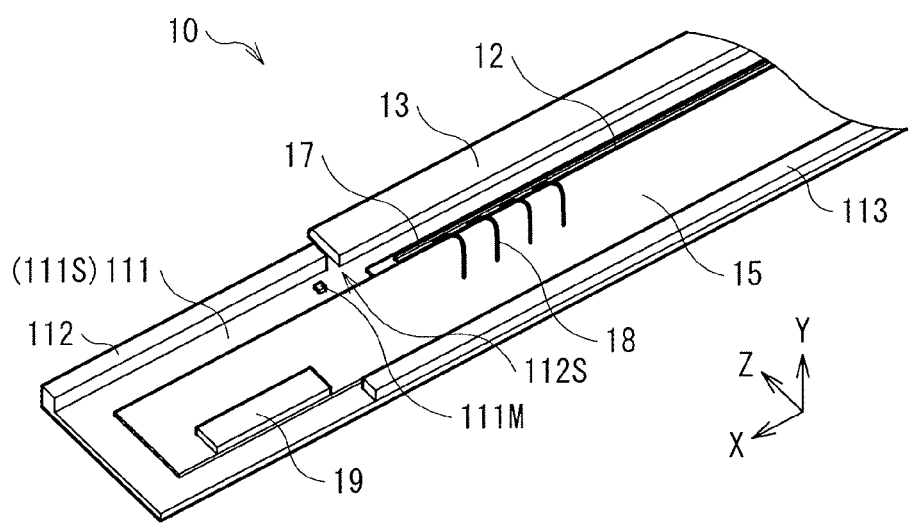
FIG. 1C is a perspective view of an example of an internal configuration of the exposure device illustrated in FIG. 1A.
Figure 2:
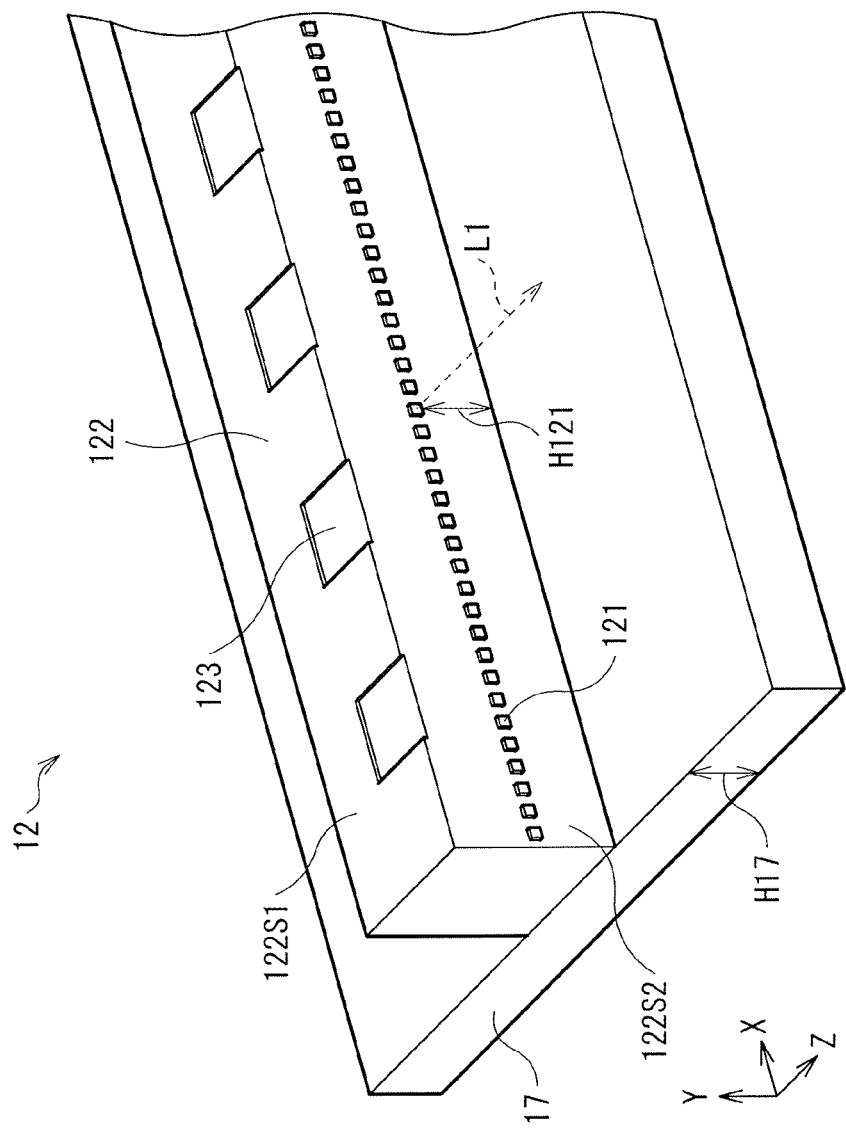
FIG. 2 is an enlarged perspective view of an example of a key part of the exposure device illustrated in FIG. 1A.

FIG. 1A is a front view of an example of an overall configuration of an exposure device 10 according to a first example embodiment of the technology. FIG. 1B is a perspective view of an example of an appearance of the exposure device 10. FIG. 1C is a perspective view of an example of an internal configuration of the exposure device 10. FIG. 2 is a perspective view of a detailed configuration of a light-emitting element array 12 which will be described later in greater detail. It is to be noted that the exposure device 10 may correspond to an "exposure device" according to one specific but non-limiting embodiment of the technology.

The exposure device 10 may include a base 11, the light-emitting element array 12, a lens array 13, a cover 14, and a circuit board 15. The cover 14 may face the base 11.

The base 11 may be a plate member extending in both an X-axis direction and a Z-axis direction that are orthogonal to each other. The base 11 may configure a case 16 together with the cover 14. The X-axis direction may correspond to a "first direction" according to one specific but non-limiting embodiment of the technology. In this example, the X-axis direction may correspond to a main scanning direction of an image forming apparatus which will be described later in greater detail. The Z-axis direction may correspond to a "second direction" according to one specific but non-limiting embodiment of the technology. In this example, the Z-axis direction may correspond to an optical axis direction of the exposure device 10.

The base 11 may include a flat plate 111 and sidewalls 112 and 113. The flat plate 111 may include a planar surface 111S. The sidewalls 112 and 113 may stand on respective ends provided in the Z-axis direction, on both side of the planar surface 111S, and each may extend in the X-axis direction. The sidewalls 112 and 113 may include end surfaces 112T and 113T, respectively. Each of the end surfaces 112T and 113T may be in contact with an inner surface 14S of the cover 14. The planar surface 111S may be provided with the lens array 13, the light-emitting element array 12, and the circuit board 15 that are disposed side by side in order in the Z-axis direction. It is to be noted that, in the first example embodiment, the light-emitting element array 12 may be disposed on a pedestal 17 that is provided on the planar surface 111S and extends in the X-axis direction. The pedestal 17 may correspond to a "protrusion" according to one specific but non-limiting embodiment of the technology. In this example each of the sidewalls 112 and 113 may have a height that is greater than any of a height of the lens array 13, a total height of the light-emitting element array 12 and the pedestal 17, and a height of the circuit board 15. The term "height" may hereinafter refer to a dimension in a Y-axis direction that is orthogonal to both the X-axis direction and the Z-axis direction. The Y-axis direction may correspond to a "third direction" according to one specific but non-limiting embodiment of the technology. Accordingly, the lens array 13, the light-emitting element array 12, the pedestal 17, and the circuit board 15 may be disposed between the base 11 and the cover 14 in the Y-axis direction. It is to be noted that one end of the lens array 13 may be protruded to outside of the case 16. Further, the planar surface 111S may be provided with a marker 111M as illustrated in FIG. 1C. The marker 111M may be a reference used for alignment of the light-emitting element array 12 and the lens array 13 upon fixing the light-emitting element array 12 and the lens array 13 to the flat plate 111 in a manufacturing process of the exposure device 10.

The light-emitting element array 12 may include a plurality of light-emitting elements 121 and a body 122 that supports the light-emitting elements 121. Referring to FIG. 2 the light-emitting elements 121 each may be, for example, a light-emitting diode (LED) element that emits a light beam L1 in the +Z direction. The light-emitting elements 121 may be so disposed on the base 11 with the body 122 and the pedestal 17 in between as to be disposed side by side in a line in the X-axis direction, for example. The body 122 may be made of a semiconductor material including silicon as a major component, for example. It is to be noted that the light-emitting element array 12 may be mounted on the base 11, for example, by being bonded to the pedestal 17 by means of a general die bonding material. The pedestal 17 may be also fixed to the planar surface 111S by means of, for example, a bonding agent. Referring to FIG. 2, a plurality of pads 123 may be provided on a top surface 122S1 that is on side, of the body 122, opposite to the pedestal 17. A plurality of driver integrated circuits (ICs) and the light-emitting elements 121 may be provided on a side surface 122S2, of the body 122, that intersects with the top surface 122S1. Each of the driver ICs and the light-emitting elements 121 may be electrically coupled to corresponding one of the pads 123. Each of the pads 123 may be electrically coupled to the circuit board 15 via a wire 18.

The lens array 13 may be so disposed on the flat plate 111 as to face the light-emitting elements 121 in the Z-axis direction. The lens array 13 may be an optical system that performs imaging on each of the light beams L1 emitted by the respective light-emitting elements 121. The lens array 13 may have a structure in which a plurality of cylindrical rod lenses are bounded with each other, and may have an optical axis 13J that is substantially parallel to the Z-axis direction, for example. The lens array 13 may be fixed to the planar surface 111S of the flat plate 111 while being inserted into a slit provided in part of the sidewall 112, for example. The lens array 13 may be fixed to the planar surface 111S by means of, for example, a bonding agent. A gap 112S illustrated in FIG. 1C between the lens array 13 and the case 16 including the base 11 and the cover 14 may be sealed, for example, by means of a bonding agent. Referring to FIG. 1A, a position of any of optical axes 12J of the respective light-emitting elements 121 in the Y-axis direction and a position of the optical axis 13J of the lens array 13 in the Y-axis direction may be substantially coincident with each other in the Y-axis direction in this example. Further, the optical axes 12J and the optical axis 13J may be substantially parallel to the Z-axis direction. In other words, adjustment may be so performed that a total of a height H17 of the pedestal 17 and a height H121 is substantially equal to a height H13. The height H121 may correspond to a distance from a surface on which the pedestal 17 is bonded to the body 122 to a position of a center of light emission performed by each of the light-emitting elements 121. The height H13 may correspond to a distance from the planar surface 111S of the flat plate 111 to the optical axis 13J of the lens array 13. The height H17, the height H121, and the height H13 may each be a dimension in the Y-axis direction.

The exposure device 10 may be mounted on an image forming apparatus which will be described later in greater detail, for example, and may be so disposed as to face an object to which the exposure device 10 applies light. Non-limiting examples of the image forming apparatus may include an electronic printer. Non-limiting examples of the object to which the exposure device 10 applies light may include a photosensitive drum 41 which will be described later in greater detail.

[Example Workings of Exposure Device 10]

Upon application of a voltage to the light-emitting elements 121 of the exposure device 10, the light-emitting elements 121 may emit the respective light beams L1 each having predetermined intensity in accordance with the applied voltage. The light beams L1 emitted from the respective light-emitting elements 121 may enter the lens array 13, and may be subjected to imaging by the lens array 13 to be outputted as light beams L2 as illustrated in FIG. 1A. The outputted light beams L2 may directly travel toward the object on which exposure is to be performed. The object may be the photosensitive drum 41, for example.

[Example Effects of Exposure Device 10]

As described above, the exposure device 10 according to the first example embodiment may have a configuration in which the light-emitting elements 121 and the lens array 13 are so disposed on the planar surface 111S of the flat plate 111 as to face each other in the Z-axis direction in which the flat plate 111 of the base 11 extends. This allows for compact arrangement of the light-emitting elements 121 and the lens array 13 on the single base 11, which contributes to reduction in dimension of the exposure device 10 as a whole. One reason for this may be that the dimension is reduced in the Y-axis direction that is orthogonal to both the X-axis direction and the Z-axis direction. Further, the exposure device 10 may have a structure in which the pedestal 17 that has been processed into a shape having predetermined dimensions in advance is disposed on the planar surface 111S of the flat plate 111, and the light-emitting elements 121 are disposed on the pedestal 17 thus provided. This eliminates the necessity to perform a highly-accurate alignment operation in the manufacturing process of the exposure device 10. It is therefore possible to manufacture the exposure device 10 in a relatively-simple manner.

[Outline Configuration of Exposure Device 10A]

Figure 3A:
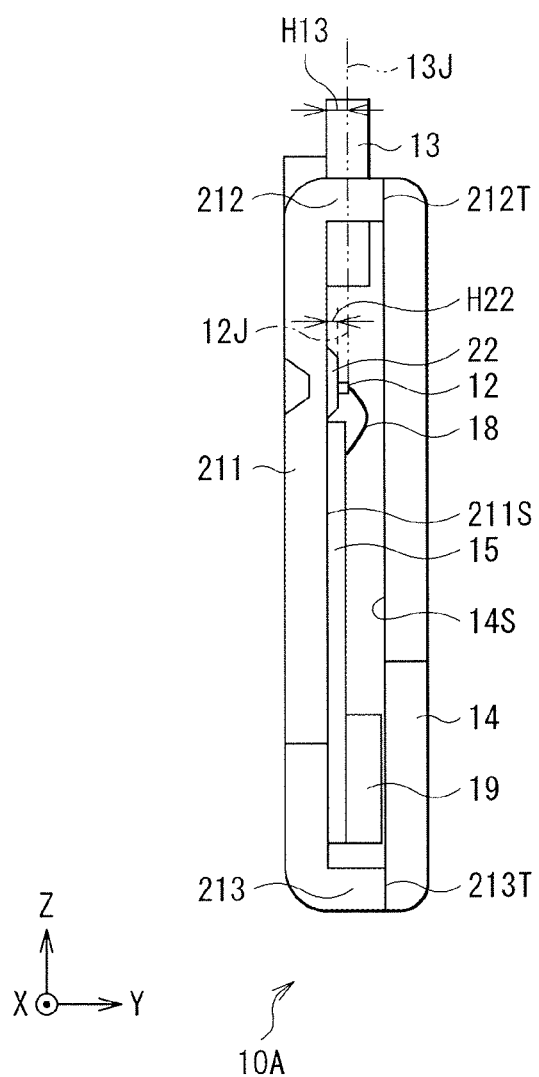
FIG. 3A is a front view of an example of an exposure device according to a first modification example.
Figure 3B:
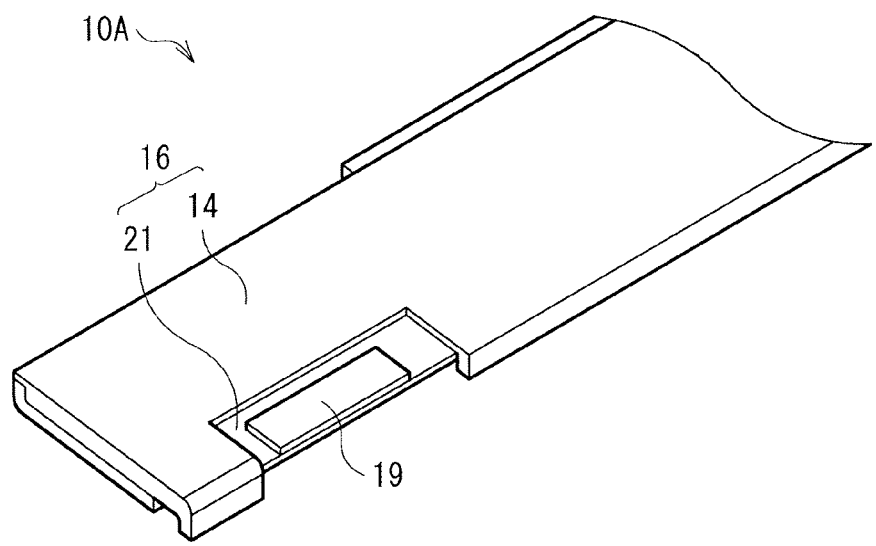
FIG. 3B is a perspective view of an example of an appearance of an exposure device illustrated in FIG. 3A.
Figure 3C:
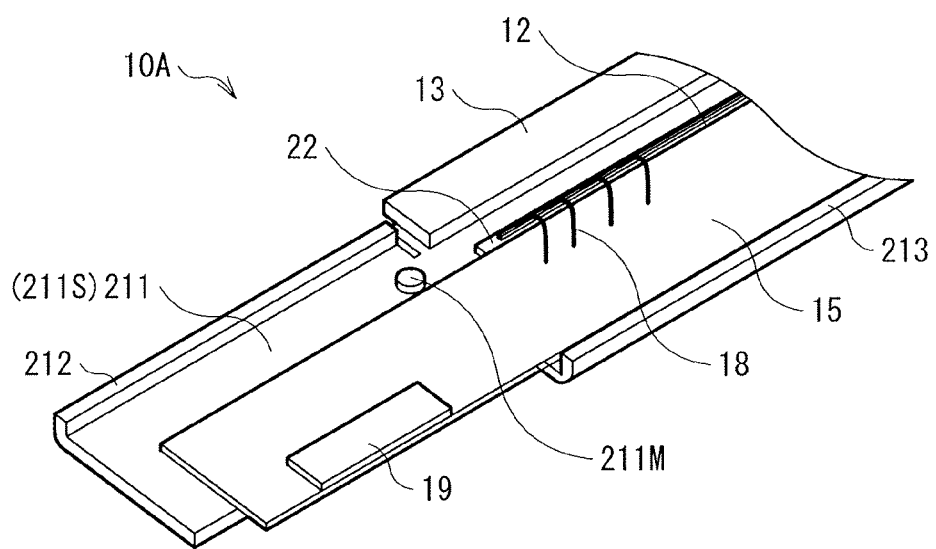
FIG. 3C is a perspective view of an example of an internal configuration of the exposure device illustrated in FIG. 3A.

FIG. 3A is a front view of an example of an overall configuration of an exposure device 10A according to a modification example of the first example embodiment of the technology. FIG. 3B is a perspective view of an example of an appearance of the exposure device 10A. FIG. 3C is a perspective view of an example of an internal configuration of the exposure device 10A. The exposure device 10A may correspond to the "exposure device" according to one specific but non-limiting embodiment of the technology.

The exposure device 10A may have a configuration that is substantially the same as the configuration of the exposure device 10 according to the foregoing first example embodiment except for including a base 21 instead of the base 11. The base 21 may include a flat plate 211 and sidewalls 212 and 213. The flat plate 211 may include a planar surface 211S. The sidewalls 212 and 213 may stand on respective ends, provided in the Z-axis direction, on both side of the planar surface 211S, and each may extend in the X-axis direction. The sidewalls 212 and 213 may include end surfaces 212T and 213T, respectively. Each of the end surfaces 212T and 213T may be in contact with the inner surface 14S of the cover 14. The base 21 may be made of a metal material such as a steel plate, for example. The flat plate 211 may be provided with a protrusion 22. The protrusion 22 may be formed by a process such as embossing, or bead processing. The protrusion 22 may correspond to the "protrusion" according to one specific but non-limiting embodiment of the technology. The protrusion 22 may extend in the X-axis direction. The planar surface 211S may be provided with the lens array 13, the light-emitting element array 12, and the circuit board 15 that are disposed side by side in order in the Z-axis direction. It is to be noted that, in the present modification example, the light-emitting element array 12 may be provided on the protrusion 22. Further, the planar surface 211S may be provided with a marker 211M as illustrated in FIG. 3C. The marker 211M may be a reference used for alignment of the light-emitting element array 12 and the lens array 13 upon fixing the light-emitting element array 12 and the lens array 13 to the flat plate 211 in a manufacturing process. The position of any of the optical axes 12J of the respective light-emitting elements 121 in the Y-axis direction and the position of the optical axis 13J of the lens array 13 in the Y-axis direction may be substantially coincident with each other in the Y-axis direction also in the exposure device 10A. Further, the optical axes 12J and the optical axis 13J may be substantially parallel to the Z-axis direction. In other words, adjustment may be so performed that a total of a height H22 of the protrusion 22 and the height H121 illustrated in FIG. 2 is substantially equal to the height H13. The height H121 may correspond to a distance from the surface on which the protrusion 22 is bonded to the body 122 illustrated in FIG. 2 to the position of the center of light emission performed by each of the light-emitting elements 121. The height H13 may correspond to a distance from the planar surface 211S of the flat plate 211 to the optical axis 13J of the lens array 13. The height H22, the height H121, and the height H13 may each be a dimension in the Y-axis direction.

[Example Effects of Exposure Device 10A]

As described above, the exposure device 10A according to the present modification example may also have a configuration in which the light-emitting element array 12 and the lens array 13 are so disposed on the planar surface 211S of the flat plate 211 as to face each other in the Z-axis direction in which the flat plate 211 of the base 21 extends. This allows for compact arrangement of the light-emitting element array 12 and the lens array 13 on the single base 21, which contributes to reduction in dimension of the exposure device 10A as a whole. In particular, the flat plate 211 may be provided with the protrusion 22 formed by embossing, or bead processing, and the light-emitting element array 12 may be provided on the protrusion 22 thus formed. It is therefore possible to perform alignment of the optical axes of the light-emitting element array 12 and the lens array 13 with each other in a relatively-easy manner. The embossing, or the bead processing, may be suitable for fine processing, and may allow for accurate definition of the height H22 of the protrusion 22. The height H22 of the protrusion 22 may be a gap between the planar surface 211S and an end of the protrusion 22 in the Y-axis direction. Further, the formation of the protrusion 22 by embossing, or bead processing, enhances mechanical strength of the flat plate 211 of the base 21. It is therefore also possible to effectively suppress, for example, occurrence of a warpage of the base 21 or occurrence of bending of the base 21 due to external force.

[Outline Configuration of Image Forming Apparatus 100]

Figure 4:
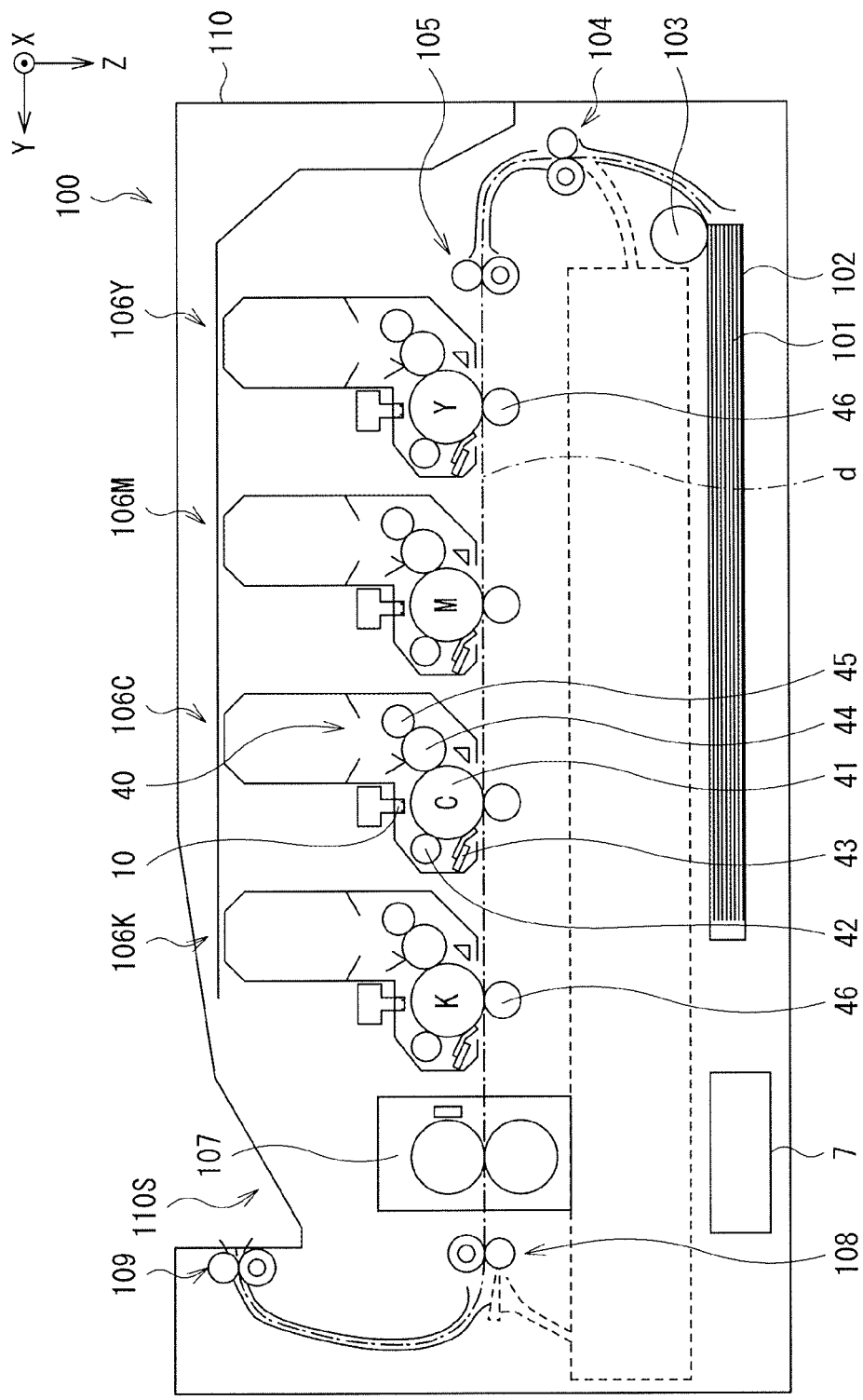
FIG. 4 schematically illustrates an example of an overall configuration of an image forming apparatus provided with the exposure device illustrated in FIG. 1A.

FIG. 4 schematically illustrates an example of an overall configuration example of the image forming apparatus 100 provided with the exposure device 10 described above. The image forming apparatus 100 may be an electrophotographic printer that forms an image such as a color image on a medium, for example. The medium may be also referred to as a print medium or a transfer member. Non-limiting examples of the medium may include a sheet and a film. The medium may be also referred to as a print medium or a transfer material. The image forming apparatus 100 may correspond to an "image forming apparatus" according to one specific but non-limiting embodiment of the technology.

Referring to FIG. 4 the image forming apparatus 100 may include a medium feeding cassette 102, a medium feeding roller (a hopping roller) 103, a pair of conveying rollers 104, a pair of conveying rollers 105, four image forming units (four process units), i.e., image forming units (process units) 106Y, 106M, 106C, and 106K, a fixing unit 107, a pair of discharging rollers 108, and a pair of discharging rollers 109, for example. The foregoing members may be disposed inside a housing 110 in order from upstream toward downstream, for example. A stacker 110S may be provided at an upper part of the housing 110. Further, the image forming apparatus 100 may include an external interface unit and a controller 7. The external interface unit may be built in the image forming apparatus 100, and receive print data from an external apparatus such as a personal computer (PC). The controller 7 may perform an overall operation control of the image forming apparatus 100.

The medium feeding cassette 102 may contain media 101 in a stacked state. The medium feeding cassette 102 may be attached detachably to a lower part of the image forming apparatus 100, for example.

The medium feeding roller 103 may pick up the media 101 separately one by one from the top of the media 101 contained in the medium feeding cassette 102, and feed the medium 101 picked up toward the pair of conveying rollers 104. In other words, the medium feeding roller 103 may serve as a medium feeding mechanism.

Each of the pair of conveying rollers 104 and the pair of conveying rollers 105 may sequentially sandwich the media 101 fed from the medium feeding roller 103 and convey the media 101 toward the image forming units 106Y, 106M, 106C, and 106K while correcting a skew of each of the media 101.

The image forming units 106Y, 106M, 106C, and 106K may be disposed in order from the upstream toward the downstream along a conveying path "d" of the medium 101 illustrated by a dashed line in FIG. 4. The conveying path "d" may have an "S" shape as a whole in this example, as illustrated in FIG. 4.

The respective image forming units 106Y, 106M, 106C, and 106K may form images (toner images) on the medium 101 using toners (developers) having colors different from each other. Specifically, the image forming unit 106Y may form a yellow toner image using a yellow (Y) toner. Similarly, the image forming unit 106M may form a magenta toner image using a magenta (M) toner. The image forming unit 106C may form a cyan toner image using a cyan (C) toner. The image forming unit 106K may form a black toner image using a black (K) toner.

The foregoing toner of each of the colors may include agents such as a predetermined coloring agent, a predetermined release agent, a predetermined electric charge control agent, and a predetermined treatment agent, for example. Components of the respective agents described above may be mixed as appropriate or subjected to a surface treatment. The toner may be thus manufactured. The coloring agent, the release agent, and the electric charge control agent out of the foregoing agents may serve as internal additives. Further, an additive such as silica and titanium oxide may be included as an external additive, and resin such as polyester resin may be included as binding resin. As the coloring agent, an agent such as a dye and a pigment may be used solely, or a plurality of agents such as a dye and a pigment may be used in any combination.

The image forming units 106Y, 106M, 106C, and 106K may have the same configuration except that the colors of the toners used to form the toner images (the developer images) are different from each other as described above. Hence, the image forming units 106Y, 106M, 106C, and 106K may be collectively referred to as an image forming unit 106 below, and a configuration, etc. of the image forming unit 106 is described below.

Referring to FIG. 4, the image forming unit 106 may include a toner cartridge 40 (a developer container), the photosensitive drum 41 (an image supporting member), a charging roller 42 (a charging member), a developing roller 44 (a developer supporting member), a feeding roller 45 (a feeding member), a cleaning blade 43, and the exposure device 10.

The toner cartridge 40 may be a container that contains the foregoing toner of each of the colors. Specifically, the toner cartridge 40 in the image forming unit 106Y may contain the yellow toner, for example. Similarly, the toner cartridge 40 in the image forming unit 106M may contain the magenta toner. The toner cartridge 40 in the image forming unit 106C may contain the cyan toner. The toner cartridge 40 in the image forming unit 106K may contain the black toner.

The photosensitive drum 41 may have a surface (a surficial part) supporting an electrostatic latent image. The photosensitive drum 41 may include a photoreceptor such as an organic photoreceptor. Specifically, the photosensitive drum 41 may include an electrically-conductive supporting body and a photoconductive layer that covers a circumferential part (a surface) of the electrically-conductive supporting body. The electrically-conductive supporting body may include a metal pipe made of aluminum, for example. The photoconductive layer may have a structure including an electric charge generation layer and an electric charge transfer layer that are stacked in order, for example. It is to be noted that the foregoing photosensitive drum 41 may rotate at a predetermined circumferential velocity.

The charging roller 42 may electrically charge the surface of the photosensitive drum 41. The charging roller 42 may be so disposed as to be in contact with the surface of the photosensitive drum 41. The charging roller 42 may include a metal shaft and an electrically-semiconductive rubber layer that covers an outer circumferential part (a surface) of the metal shaft, for example. Non-limiting examples of the electrically-semiconductive rubber layer may include an electrically-semiconductive epichlorohydrin rubber layer. It is to be noted that the charging roller 42 may rotate in a direction opposite to a rotation direction of the photosensitive drum 41, for example.

The developing roller 44 may have a surface supporting the toner that develops the electrostatic latent image. The developing roller 44 may be so disposed as to be in contact with the surface (the circumferential surface) of the photosensitive drum 41. The developing roller 44 may include a metal shaft and an electrically-semiconductive urethane rubber layer that covers an outer circumferential part (a surface) of the metal shaft. It is to be noted that the foregoing developing roller 44 may rotate in a direction opposite to the rotation direction of the photosensitive drum 41 at a predetermined circumferential velocity, for example.

The feeding roller 45 may feed the toner contained inside the toner cartridge 40 to the developing roller 44. The feeding roller 45 may be so disposed as to be in contact with a surface (a circumferential surface) of the developing roller 44. The feeding roller 45 may include a metal shaft and a foamed silicone rubber layer that covers an outer circumferential part (a surface) of the metal shaft, for example. It is to be noted that the feeding roller 45 may rotate in a direction same as the rotation direction of the developing roller 44, for example.

The cleaning blade 43 may scrape the toner remained on the surface (the surficial part) of the photosensitive drum 41 to thereby remove the remained toner from the surface (the surficial part) of the photosensitive drum 41. In other words, the cleaning blade 43 may clean the surface (the surficial part) of the photosensitive drum 41. The cleaning blade 43 may be so disposed as to be in contact with the surface of the photosensitive drum 41 in a counter direction. In other words, the cleaning blade 43 may be so disposed as to protrude in a direction opposite to the rotation direction of the photosensitive drum 41. The cleaning blade 43 may be made of an elastic material such as polyurethane rubber, for example.

Figure 5:
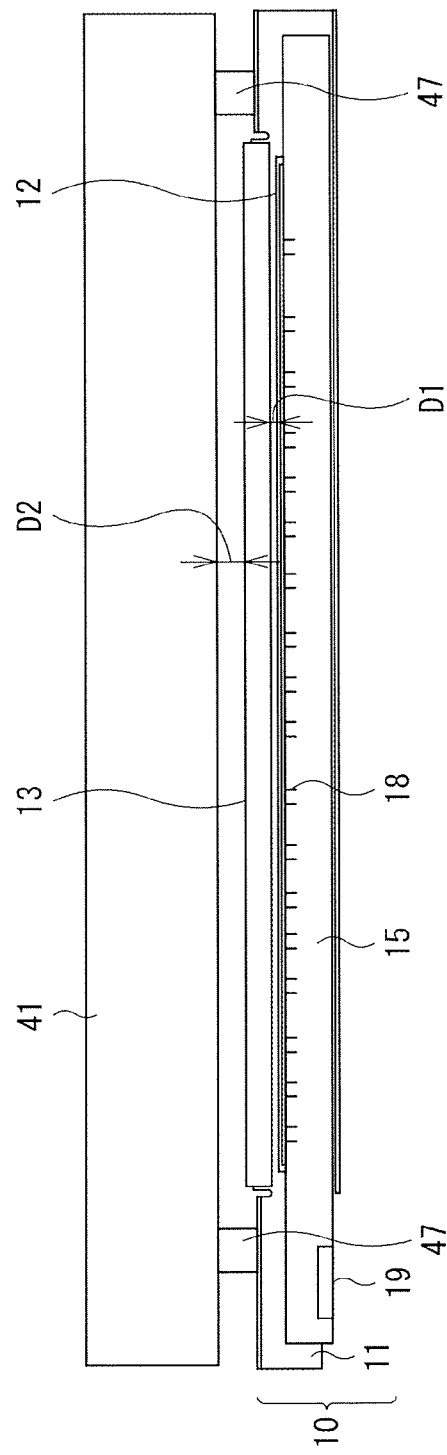
FIG. 5 is a side view of an example of the vicinity of the exposure device provided in an image forming apparatus illustrated in FIG. 4.

The exposure device 10 may be the one described above according to the example embodiment, and may face the photosensitive drum 41 as illustrated in FIG. 5. The exposure device 10 may selectively apply, on the basis of the image data, application light onto the surface of the photosensitive drum 41 electrically charged by the charging roller 42. The exposure device 10 may thus perform exposure on the surface of the photosensitive drum 41, and thereby form an electrostatic latent image on the surface (the surficial part) of the photosensitive drum 41. The exposure device 10 may be supported by the housing 110, for example. A distance D2 from the lens array 13 to the surface of the photosensitive drum 41 may be substantially equal to a focal length of the lens array 13. In other words, the distance D2 may be substantially equal to a distance D1 from the light-emitting element array 12 and the lens array 13. Further, a connector 19 may be provided on part of the circuit board 15. The light-emitting elements 121 each may be coupled to the controller 7 via components such as the wire 18, the circuit board 15, and the connector 19. The light-emitting elements 121 may perform light emission selectively at a predetermined timing on the basis of the control performed by the controller 7.

The transfer roller 46 may electrostatically transfer, onto the medium 101, the toner image formed inside each of the image forming units 106Y, 106M, 106C, and 106K. The transfer roller 46 may be so disposed as to face each of the photosensitive drums 41 in the respective image forming units 106Y, 106M, 106C, and 106K. It is to be noted that the transfer roller 46 may be made of a foamed electrically-semiconductive elastic rubber material, for example.

The fixing unit 107 may apply heat and pressure to the toner (the toner image) on the medium 101 conveyed from the image forming unit 106K, and thereby fix the toner image onto the medium 101. The fixing unit 107 may include a heating unit and a pressure-applying roller that are so disposed as to face each other with the conveying path "d" of the medium 101 in between, for example. It is to be noted that the fixing unit 107 may be integrally attached to the image forming apparatus 100, or may be attached detachably to the image forming apparatus 100, for example.

The pair of discharging rollers 108 and the pair of discharging rollers 109 may each guide the medium 101 when the medium 101 onto which the toner is fixed by the fixing unit 107 is to be discharged to outside of the image forming apparatus 100. The medium 101 that has been discharged to the outside of the housing 110 after sequentially passing through the pair of discharging rollers 108 and the pair of discharging rollers 109 may be discharged in a face-down state toward the stacker 110S provided at the upper part of the housing 110. It is to be noted that the stacker 110S may be a part in which the media 101 on each of which an image is formed (printed) are to be accumulated.

[Operations and Workings of Image Forming Apparatus 100]

The image forming apparatus 100 may transfer the toner image onto the medium 101 in the following manner. In other words, the image forming apparatus 100 may perform a printing operation in the following manner.

When the print image data and printing order are supplied from an external device such as a PC to the controller 7 in the image forming apparatus 100 in an operating state, the controller 7 may start the printing operation of the print image data according to the printing order.

For example, referring to FIG. 4, the media 101 contained in the medium feeding cassette 102 may be picked up one by one from the top by the medium feeding roller 103. The medium 101 picked up may be conveyed by members such as the pair of conveying rollers 104 and the pair of conveying rollers 105 while a skew of the medium 101 is corrected by the members such as the pair of conveying rollers 104 and the pair of conveying rollers 105. The medium 101 may be thus conveyed to the image forming units 106Y, 106M, 106C, and 106K provided downstream of the members such as the pair of conveying rollers 104 and the pair of conveying rollers 105. The image forming units 106Y, 106M, 106C, and 106K may each transfer the toner image onto the medium 101 in the following manner.

In each of the image forming units 106Y, 106M, 106C, and 106K, the toner image of each of the colors may be formed through the following electrophotographic process according to the printing order given by the controller 7. Specifically, the controller 7 may activate a driver to cause the photosensitive drum 41 to rotate in a predetermined rotation direction at a constant velocity. In accordance with the rotation of the photosensitive drum 41, the members such as the charging roller 42, the developing roller 44, and the feeding roller 45 may each start a rotation operation in a predetermined direction.

The controller 7 may apply a predetermined voltage to the charging roller 42 for each of the colors, to thereby electrically charge the surface of the photosensitive drum 41 for each of the colors uniformly. Thereafter, the controller 7 may supply a control signal to the exposure device 10 to thereby activate the exposure device 10. The activated exposure device 10 may apply, onto the respective photosensitive drums 41 of the respective colors, light beams corresponding to the respective color components of the print image based on the image data, thereby forming the electrostatic latent images on the surfaces of the photosensitive drums 41 of the respective colors.

The toner contained inside the toner cartridge 40 may be fed to the developing roller 44 via the feeding roller 45. The fed toner may be supported by the surface of the developing roller 44. The developing roller 44 may attach the toner to the electrostatic latent image formed on the photosensitive drum 41 to thereby form the toner image. Further, the transfer roller 46 may receive a voltage, leading to generation of an electric field between the photosensitive drum 41 and the transfer roller 46. When the medium 101 passes between the photosensitive drum 41 and the transfer roller 46 in such a state, the toner image formed on the photosensitive drum 41 may be transferred onto the medium 101.

Thereafter, the toner images on the medium 101 may be applied with heat and pressure by the fixing unit 107, to be thereby fixed onto the medium 101. Finally, the medium 101 onto which the toner images are fixed may be discharged, by the pair of discharging rollers 108 and the pair of discharging rollers 109, to the outside and stocked in the stacker 110S. This may bring the printing operation performed on the medium 101 to the end.

This image forming apparatus 100 may include the exposure device 10 described above, by which the image forming unit 106 may be reduced in size. As a result, it is possible to achieve reduction in size of the image forming apparatus as a whole.

2. Second Example Embodiment

[Configuration of Image Reader 200 Provided with Light Receiving Device 60]

Figure 6:
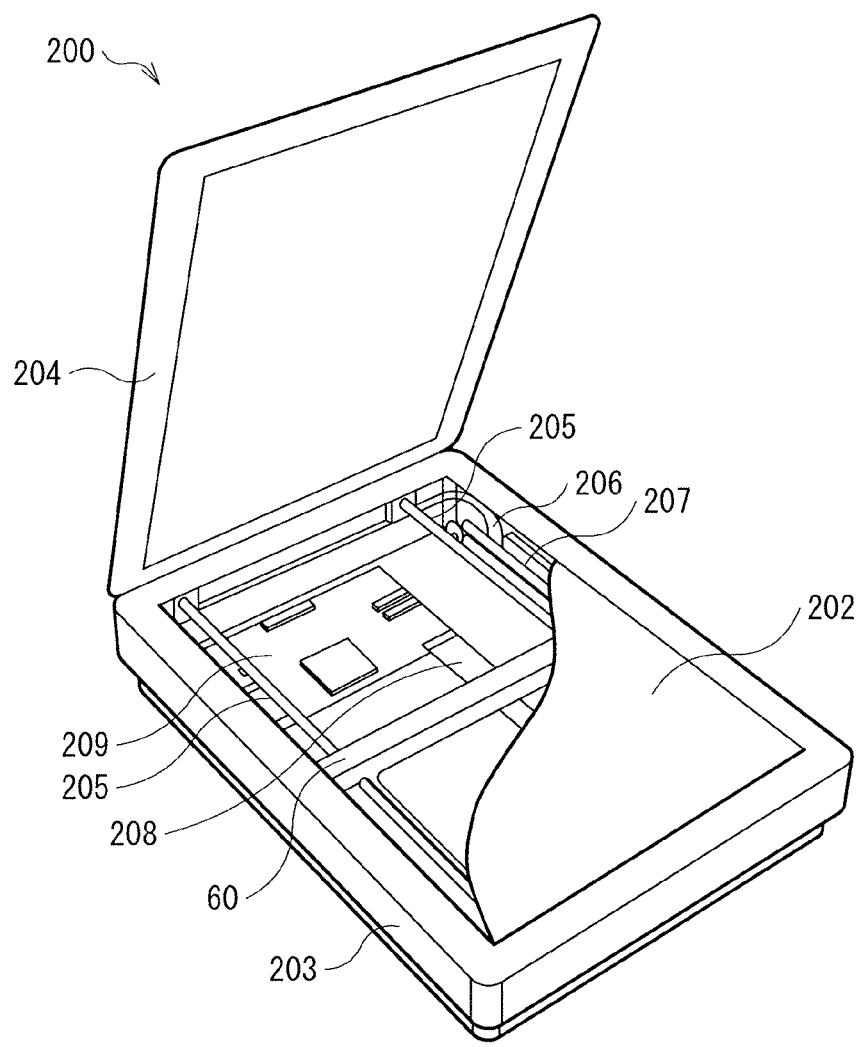
FIG. 6 is a perspective view of an example of an overall configuration of an image reader according to a second example embodiment of the technology.
Figure 7:
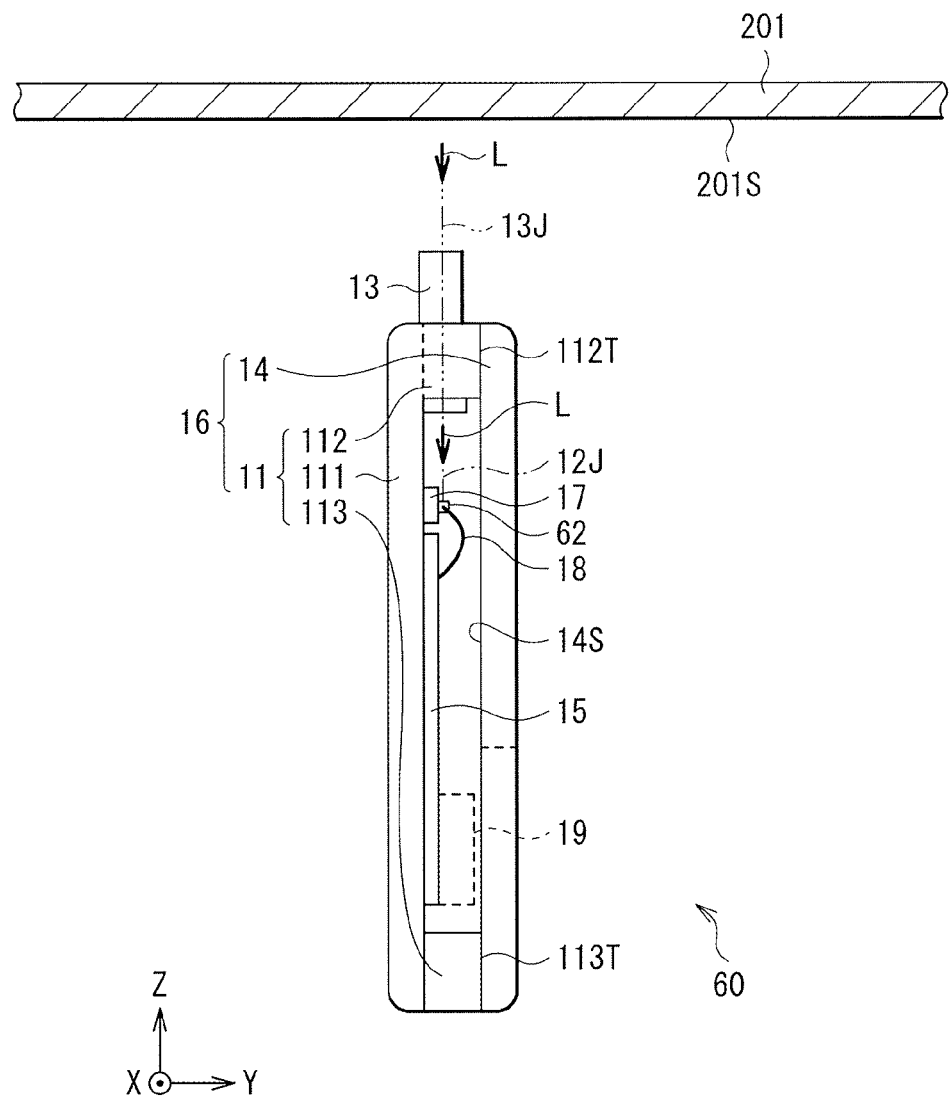
FIG. 7 is a front view of an example of an overall configuration of a light receiving device illustrated in FIG. 6.
Figure 8:
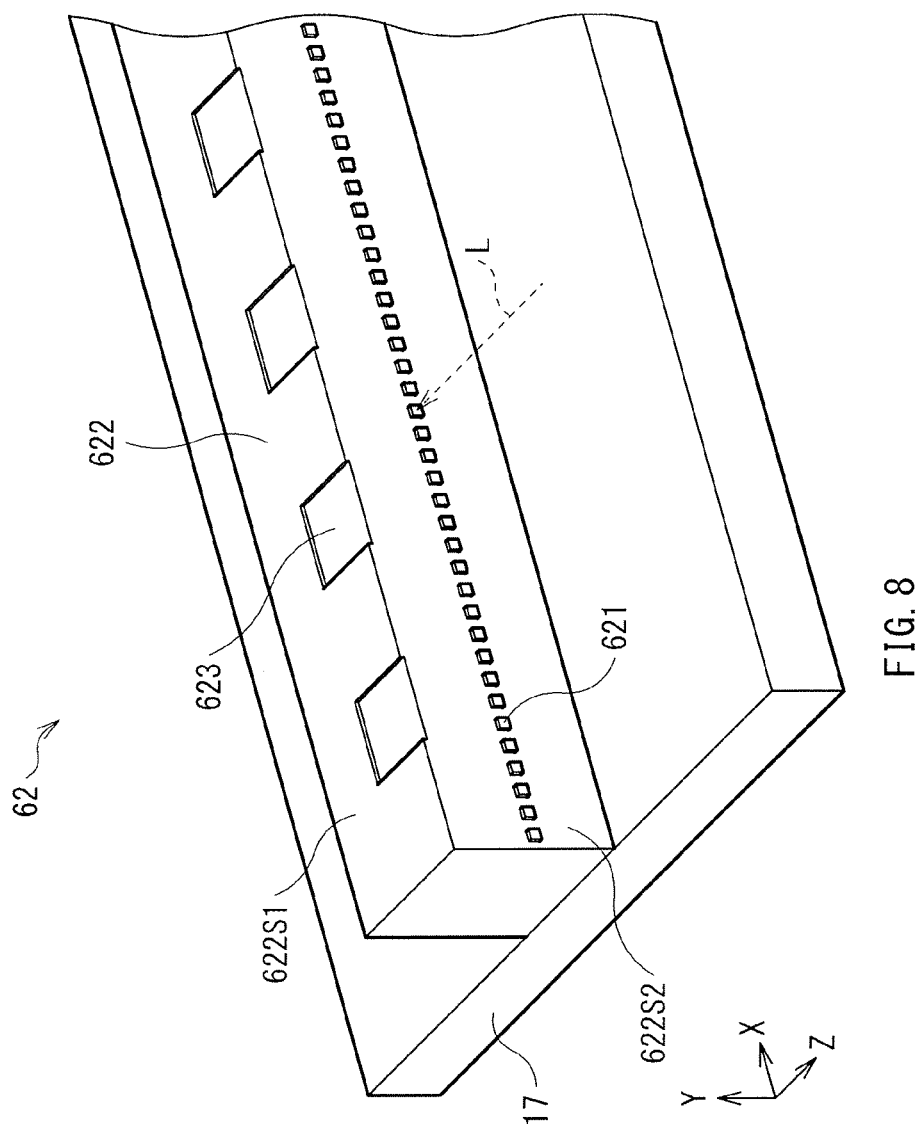
FIG. 8 is an enlarged perspective view of an example of a key part of the light receiving device illustrated in FIG. 6.

FIG. 6 is a perspective view of an example of an overall configuration of an image reader 200 provided with a light receiving device 60. FIG. 7 is a cross-sectional view of an example of a configuration of a key part of the light receiving device 60. FIG. 8 is a perspective view of a detailed configuration of a light-receiving element array 62 in the light receiving device 60 which will be described later in greater detail.

The image reader 200 illustrated in FIG. 6 may be a so-called image scanner, for example. The image reader 200 may acquire, as electronic data, a component such as a text, a diagram, and a photograph provided on a reading medium 201 illustrated in FIG. 7. The reading medium 201 may be a medium to be read by the image reader 200. The image reader 200 may include a housing 203 and a cover 204. The housing 203 may include, at an upper part of the housing 203, a placing surface 202 on which the reading medium 201 to be read is to be placed. The cover 204 may face the placing surface 202 and be openable and closable. The image reader 200 may include, inside the housing 203, the light receiving device 60, a pair of guiding members 205, a stepping motor 206, a driving belt 207, a flexible flat cable 208, and a control circuit 209. The pair of guiding members 205 may support the light receiving device 60. The light receiving device 60 may extend across laterally the placing surface 202 in the X-axis direction, for example. The light receiving device 60 may be supported by the pair of guiding members 205 at the both ends of the light receiving device 60 in the X-axis direction. The pair of guiding members 205 may extend in the Y-axis direction. Accordingly, the light receiving device 60 may be coupled to the driving belt 207, and be able to perform scanning across the placing surface 202 longitudinally in the Y-axis direction in accordance with rotation of the driving belt 207. The stepping motor 206 may be driven on the basis of an instruction supplied from the control circuit 209. The driving belt 207 may rotate owing to the driving of the stepping motor 206. Upon a reading operation, the cover 204 may be so closed that the cover 204 and the placing surface 202 sandwich the reading medium 201 in between. The light receiving device 60 may be coupled to the control circuit 209 by the flexible flat cable 208. The light receiving device 60 may receive feeding from a power source via the flexible flat cable 208. The light receiving device 60 may transmit a signal to the control circuit 209 and may receive a signal from the control circuit 209, via the flexible flat cable 208.

[Configuration of Light Receiving Device 60]

Referring to FIGS. 7 and 8, a description is given below of a detailed configuration of the light receiving device 60. The light receiving device 60 may have a configuration that is substantially the same as the configuration of the exposure device 10 described above according to the first example embodiment, except for including the light-receiving element array 62 instead of the light-emitting element array 12. Specifically, the light-receiving element array 62 may include a plurality of light-receiving elements 621 and a body 622 that supports the light-receiving elements 621 as illustrated in FIG. 8. The light-receiving elements 621 each may be an image sensor that receives a light beam L traveling in −Z direction, for example. The light-receiving elements 621 may be so provided on the base 11 with the body 622 and the pedestal 17 in between as to be disposed side by side in a line in the X-axis direction, for example.

The body 622 may be made of a semiconductor material including silicon as a main component, for example. Referring to FIG. 8, a plurality of pads 623 may be provided on a top surface 622S1 that is on side, of the body 622, opposite to the pedestal 17. A plurality of driver integrated circuits (ICs) and the light-receiving elements 621 may be provided on a side surface 622S2, of the body 622, that intersects with the top surface 622S1. Each of the driver ICs and the light-receiving elements 621 may be electrically coupled to corresponding one of the pads 623. Each of the pads 623 may be electrically coupled to the circuit board 15 via a wire 18. As illustrated in FIG. 7, the light beam L traveling from a surface 201S of the reading medium 201 may be subjected to imaging on a light receiving surface of each of the light-receiving elements 621 via the lens array 13. The light beam L may be, for example, a reflected light beam of the light beam applied to the surface 201S of the reading medium 201 by an application apparatus provided separately.

[Example Effects of Light Receiving Device 60 and Image Reader 200]

As with the exposure device 10 according to the foregoing first example embodiment, the light receiving device 60 according to the second example embodiment may have a configuration in which the light-receiving elements 621 and the lens array 13 are so disposed on the planar surface 111S of the flat plate 111 as to face each other in the Z-axis direction in which the flat plate 111 of the base 11 extends. This allows for compact arrangement of the light-receiving elements 621 and the lens array 13 on the single base 11, which contributes to reduction in dimension of the light receiving device 60 as a whole. Accordingly, it is possible for the image reader 200 including the light receiving device 60 to achieve reduction in size of the image reader 200.

3. Other Modification Examples

The technology is described above referring to the example embodiments and the modification examples thereof. However, the technology is not limited to the example embodiments and the modification examples thereof described above, and is modifiable in various ways. For example, the foregoing example embodiments and the modification examples thereof are described referring to the image forming apparatus 100 of a primary transfer scheme (a direct transfer scheme). However, the technology is also applicable to a secondary transfer scheme.

The foregoing example embodiments and the modification examples thereof are described referring to the image forming apparatus having a printing function as an example corresponding to the "image forming apparatus" according to one specific but non-limiting embodiment of the technology. However, the function of the image forming apparatus is not limited thereto. Specifically, for example, the technology is also applicable to an image forming apparatus that serves as a multi-function peripheral having functions such as a scanner function and a facsimile function in addition to the printing function, for example.

Figure 9A:
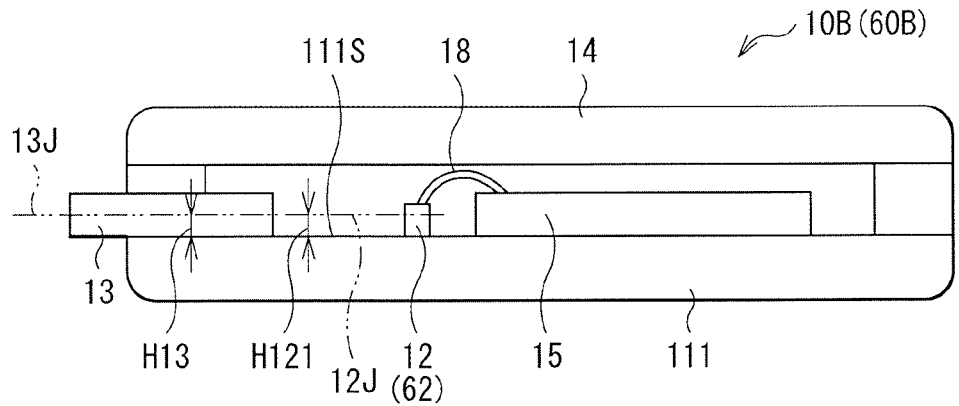
FIG. 9A is a front view of an example of an exposure device and a light receiving device according to a second modification example.

The foregoing example embodiments and the modification examples thereof are described referring to an example in which the light-emitting element array 12 or the light-receiving element array 62 is disposed on the flat plate 111 of the base 11 with the pedestal 17 in between; however, the technology is not limited thereto. For example, as an exposure device 10B or a light receiving device 60B according to a second modification example illustrated in FIG. 9A, the light-emitting element array 12 or the light-receiving element array 62 may be disposed directly on the planar surface 111S of the flat plate 111. Also in the exposure device 10B or the light receiving device 60B, the position of any of the optical axes 12J of the respective light-emitting elements 121 in the Y-axis direction or the position of any of optical axes 62J of the respective light-receiving elements 621 in the Y-axis direction and the position of the optical axis 13J of the lens array 13 in the Y-axis direction may be substantially coincident with each other in the Y-axis direction. Further, the optical axes 12J or the optical axes 62J and the optical axis 13J may be substantially parallel to the Z-axis direction. In other words, adjustment may be so performed that the height H121 is substantially equal to the height H13. The height H121 may correspond to the distance from the planar surface 111S to the position of the center of light emission performed by each of the light-emitting elements 121 or the position of the center of light reception performed by each of the light-receiving elements 621. The height H13 may correspond to the distance from the planar surface 111S to the optical axis 13J. Further, the lens array 13 may be provided on the flat plate 111 with the pedestal in between.

Figure 9B:
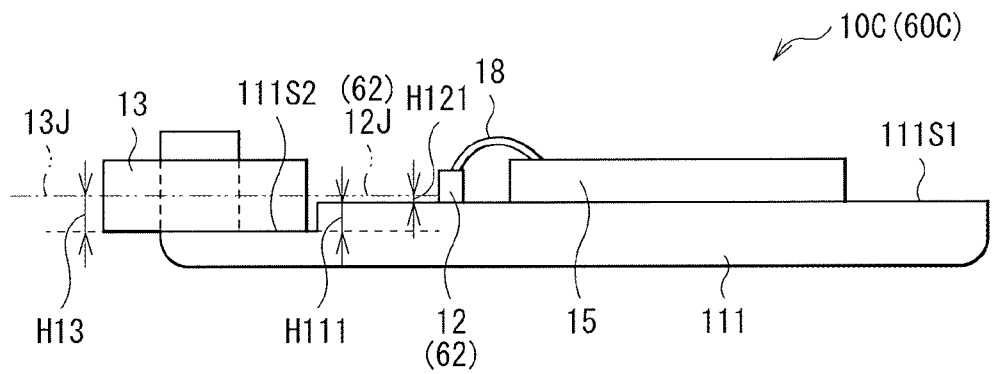
FIG. 9B is a front view of an example of an exposure device and a light receiving device according to a third modification example.
Figure 9C:
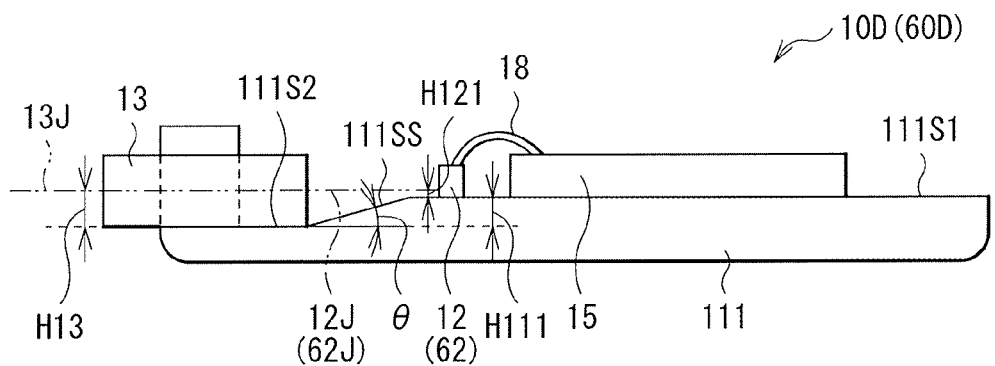
FIG. 9C is a front view of an example of an exposure device and a light receiving device according to a fourth modification example.

The foregoing example embodiments and the modification examples thereof are described referring to an example in which the planar surface 111S of the flat plate 111 is flat; however, the technology is not limited thereto. For example, as an exposure device 10C or a light receiving device 60C according to a third modification example illustrated in FIG. 9B, the technology is applicable to an example case in which the flat plate 111 has a level difference that is provided by a planar surface 111S1 and a planar surface 111S2 that have respective heights different from each other. For example, the light-emitting element array 12 or the light-receiving element array 62 may be directly disposed on the planar surface 111S1, and the lens array 13 may be disposed on the planar surface 111S2. Also in the exposure device 10C or the light receiving device 60C, the position of any of the optical axes 12J of the respective light-emitting elements 121 in the Y-axis direction or the position of any of the optical axes 62J of the respective light-receiving elements 621 in the Y-axis direction and the position of the optical axis 13J of the lens array 13 in the Y-axis direction may be substantially coincident with each other in the Y-axis direction. Further, the optical axes 12J or the optical axes 62J and the optical axis 13J may be substantially parallel to the Z-axis direction. In other words, adjustment may be so performed that a total of a height H111 and the height H121 is substantially equal to the height H13. The height H111 may correspond to a distance from the planar surface 111S2 to the planar surface 111S1. The height H121 may correspond to the distance from the surface 111S1 to the position of the center of light emission performed by each of the light-emitting elements 121 or the center of the light reception performed by each of the light-receiving elements 621. The height H13 may correspond to the distance from the planar surface 111S2 to the optical axis 13J. Moreover, for example, as an exposure device 10D or a light receiving device 60D according to a fourth modification example illustrated in FIG. 9C, the technology is applicable to an example case in which the flat plate 111 includes the planar surface 111S1 and the planar surface 111S2 that have respective heights different from each other and a sloped surface 111SS that connects the planar surface 111S1 and the planar surface 111S2 with each other. Also in the exposure device 10D or the light receiving device 60D, the position of any of the optical axes 12J of the respective light-emitting elements 121 in the Y-axis direction or the position of any of the optical axes 62J of the respective light-receiving elements 621 in the Y-axis direction and the position of the optical axis 13J of the lens array 13 in the Y-axis direction may be substantially coincident with each other in the Y-axis direction. Further, the optical axes 12J or the optical axes 62J and the optical axis 13J may be substantially parallel to the Z-axis direction. In other words, adjustment may be so performed that a total of the height H111 and the height H121 is substantially equal to the height H13. The height H111 may correspond to the distance from the planar surface 111S2 to the planar surface 111S1. The height H121 may correspond to the distance from the surface 111S1 to the position of the center of light emission performed by each of the light-emitting elements 121 or the position of the center of light reception performed by each of the light-receiving elements 621. The height H13 may correspond to the distance from the planar surface 111S2 to the optical axis 13J. By adopting the examples described above referring to the third and fourth modification examples respectively illustrated in FIGS. 9B and 9C, it is possible to perform alignment with high accuracy of the optical axes 12J of the light-emitting element array 12 or the optical axes 62J of the light-receiving element array 62 and the optical axis 13J of the lens array 13, without providing the pedestal 17. The light receiving device according to one implementation of the technology may have a configuration in which the light-receiving elements may be provided on the protrusion 22 of the flat plate 211, as with the exposure device 10A illustrated in FIG. 3A.

Furthermore, the technology encompasses any possible combination of some or all of the various embodiments and the modifications described herein and incorporated herein.

It is possible to achieve at least the following configurations from the above-described example embodiments of the technology.

(1)

An exposure device including:

a plate member that extends in both a first direction and a second direction intersecting with the first direction;

a plurality of light-emitting elements disposed on the plate member side by side in the first direction, the light-emitting elements emitting respective light beams in the second direction; and an optical system that is disposed on the plate member and faces the light-emitting elements in the second direction, the optical system performing imaging of the light beams emitted by the respective light-emitting elements.

(2)

The exposure device according to (1), in which a first position of any of first optical axes of the respective light-emitting elements in a third direction and a second position of a second optical axis of the optical system in the third direction are substantially coincident with each other in the third direction, and are substantially parallel to the second direction, the third direction being orthogonal to both the first direction and the second direction.

(3)

The exposure device according to (1) or (2), in which the plate member includes a protrusion that extends in the first direction, and the light-emitting elements are disposed on the protrusion.

(4)

The exposure device according to (3), in which the plate member is made of a steel plate, and the protrusion is formed by embossing.

(5)

The exposure device according to any one of (1) to (4), in which the plate member includes a planar surface that extends in both the first direction and the second direction, the light-emitting elements are disposed on the planar surface directly or indirectly, and the optical system is disposed on the planar surface directly or indirectly.

(6)

The exposure device according to any one of (1) to (5), further including a circuit board disposed on the plate member on side opposite to the optical system with the light-emitting elements in between, in which each of the light-emitting elements and the circuit board are electrically coupled to each other with wire.

(7)

An image forming apparatus including the exposure device according to any one of (1) to (6).

(8)

A light receiving device including:

a plate member that extends in both a first direction and a second direction intersecting with the first direction;

a plurality of light-receiving elements disposed on the plate member side by side in the first direction; and an optical system that is disposed on the plate member and faces the light-receiving elements in the second direction, the optical system performing imaging, with respect to the light-receiving elements, of a light beam entering from outside.

(9)

An image reader including the light receiving device according to (8).

In each of the exposure device and the image forming apparatus according to one embodiment of the technology, each of the light-emitting elements and the optical system are disposed on the plate member and face each other in the second direction in which the plate member extends. This allows for compact arrangement of the light-emitting elements and the optical system on the single plate member, which reduces a dimension in a direction orthogonal to both the first direction and the second direction. This is suitable for reduction in dimension of the exposure device as a whole.

In each of the exposure device and the image forming apparatus according to one embodiment of the technology, a first position of any of the first optical axes of the respective light-emitting elements in a third direction and a second position of the second optical axis of the optical system in the third direction may be substantially coincident with each other in the third direction, and may be substantially parallel to the second direction. The third direction is orthogonal to both the first direction and the second direction. This is advantageous in further reduction in dimension of the exposure device as a whole.

In each of the exposure device and the image forming apparatus according to one embodiment of the technology, the plate member may include the protrusion that extends in the first direction. The light-emitting elements may be disposed on the protrusion. This makes it easier to perform alignment of each of the first optical axes of the light-emitting elements and the second axis of the optical system. Further, the plate member may be made of the steel plate, and the protrusion may be formed by the embossing. This allows for fine processing of the protrusion. This also allows for adjustment of positions of the light-emitting elements and the optical system with high accuracy. This also enhances strength of the plate member.

In each of the exposure device and the image forming apparatus according to one embodiment of the technology, the plate member may include a planar surface that extends in both the first direction and the second direction, for example. The light-emitting elements may be disposed on the planar surface directly or indirectly. The optical system may be disposed on the planar surface directly or indirectly.

In each of the exposure device and the image forming apparatus according to one embodiment of the technology, a circuit board disposed on the plate member may be further provided on side opposite to the optical system with the light-emitting elements in between. Each of the light-emitting elements and the circuit board may be electrically coupled to each other with wire.

In each of the light receiving device and the image reader according to one embodiment of the technology, each of the light-receiving elements and the optical system are disposed on the plate member and face each other in the second direction in which the plate member extends. This allows for compact arrangement of the light-receiving elements and the optical system on the single plate member. This is suitable for reduction in dimension of the light receiving device as a whole.

According to each of the exposure device, the image forming apparatus, the light receiving device, and the image reader of one embodiment of the technology, it is possible to provide a structure more suitable for reduction in size.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An exposure device comprising:
a plate member having a first surface that extends in both a first direction and a second direction intersecting with the first direction;
a light-emitting element array including a plurality of light-emitting elements, and provided directly on the first surface of the plate member, the light-emitting elements being disposed side by side in the first direction and emitting respective light beams in the second direction, light-emitting surfaces of the plurality of light-emitting elements being arranged in a plane substantially orthogonal to the first surface of the plate member; and an optical system that is disposed directly on the plate member and faces the light-emitting elements in the second direction, the optical system performing imaging of the light beams emitted by the respective light-emitting elements.

2. An exposure device comprising:
a plate member that extends in both a first direction and a second direction intersecting with the first direction;
a plurality of light-emitting elements disposed on the plate member side by side in the first direction, the light-emitting elements emitting respective light beams in the second direction; and
an optical system that is disposed on the plate member and faces the light-emitting elements in the second direction, the optical system performing imaging of the light beams emitted by the respective light-emitting elements, wherein
a first position of any of first optical axes of the respective light-emitting elements in a third direction and a second position of a second optical axis of the optical system in the third direction are substantially coincident with each other in the third direction, and are substantially parallel to the second direction, the third direction being orthogonal to both the first direction and the second direction.

3. The exposure device according to claim 1, wherein
the plate member includes a protrusion that extends in the first direction,
the protrusion has a top surface that serves as the first surface, and
the light-emitting element array is disposed on the top surface of the protrusion.

4. The exposure device according to claim 1, wherein
the plate member is made of a steel plate and includes a protrusion,
the protrusion is formed by embossing and has a top surface that serves as the first surface, and
the light-emitting element array is disposed on the top surface of the protrusion.

5. The exposure device according to claim 1, further comprising
a circuit board disposed on a second surface of the plate member on side opposite to the optical system with the light-emitting element array in between, the second surface being parallel to the first surface, wherein
each of the light-emitting elements and the circuit board are electrically coupled to each other with wire.

6. An image forming apparatus comprising the exposure device according to claim 1.

7. A light receiving device comprising:
a plate member having a first surface that extends in both a first direction and a second direction intersecting with the first direction;
a light-receiving element array including a plurality of light-receiving elements, and provided directly on the first surface of the plate member, the light-receiving elements being disposed side by side in the first direction, light-receiving surfaces of the plurality of light-receiving elements being arranged in a plane substantially orthogonal to the first surface of the plate member; and
an optical system that is disposed directly on the plate member and faces the light-receiving elements in the second direction, the optical system performing imaging, with respect to the light-receiving elements, of a light beam entering from outside.

8. An image reader comprising the light receiving device according to claim 7.

9. The exposure device according to claim 1, wherein the optical system is disposed on a second surface of the plate member, the second surface being parallel to the first surface.

10. The exposure device according to claim 9, wherein
the light-emitting element array is bonded to the first surface, and
the optical system is bonded to the second surface.

* * * * *